United States Patent [19]

Paul et al.

[11] Patent Number: 4,804,566
[45] Date of Patent: Feb. 14, 1989

[54] MULTILAYER POLYESTER STRUCTURES AND CONTAINERS THEREOF

[75] Inventors: William C. Paul, Mt. Vernon; Kirk L. Kimbel, Evansville, both of Ind.

[73] Assignee: General Electric Company, Mt. Vernon, Ind.

[21] Appl. No.: 878,230

[22] Filed: Jun. 25, 1986

[51] Int. Cl.$^4$ .................. B65D 1/00; B32B 27/08; B32B 27/36
[52] U.S. Cl. ..................................... 428/35; 428/412; 428/480; 428/483; 525/92
[58] Field of Search ............... 428/480, 483, 35; 528/173, 296, 194; 524/352; 525/92

[56] References Cited

U.S. PATENT DOCUMENTS

| | | | |
|---|---|---|---|
| 2,936,296 | 5/1960 | Precopio et al. | 524/352 |
| 3,169,121 | 2/1965 | Goldberg | 528/173 |
| 3,692,744 | 9/1972 | Rich et al. | 528/296 |
| 4,327,137 | 4/1982 | Sawa et al. | 428/35 |
| 4,454,308 | 6/1984 | Mark et al. | 528/194 X |
| 4,465,820 | 8/1984 | Miller et al. | 528/194 |
| 4,543,292 | 9/1985 | Giles et al. | 428/412 |
| 4,576,842 | 3/1986 | Hartsing | 428/35 |

*Primary Examiner*—Thomas J. Herbert
*Attorney, Agent, or Firm*—Martin B. Barancik

[57] ABSTRACT

A multilayer structure which comprises a layer comprising a polybutylene terephthalate adjacent to a layer comprising an aromatic polyester selected from the group consisting of aromatic polycarbonate, copolyestercarbonate, polyarylate, or mixtures thereof.

10 Claims, No Drawings

MULTILAYER POLYESTER STRUCTURES AND CONTAINERS THEREOF

BACKGROUND OF THE INVENTION

Multilayer compositions have been utilized for many years. The concept of a multilayer is that the positive properties of two or more materials are combined with the structural integrity of each material being essentially uncompromised. Usually the positive properties of one material off-set or counter balance the weaker properties of the second material. For example, among the positive propertie of polycarbonate are high heat resistance and impact strength. However polycarbonate has a relatively high transmission rate for certain gases, oxygen and carbon dioxide for example. Polyvinylidene chloride does not have very high resistance to impact or heat but has excellent resistance to the transmission of oxygen and carbon dioxide. Therefore a multilayer composition utilizing polycarbonate adjacent to polyvinylidene chloride could be employed in structures wherein the properties of high impact resistance, high heat resistance and high resistance to oxygen and carbon dioxide transmission are necessary.

Although many of these multilayer compositions can be hypothesized on the basis of laminating a material possessing certain strong properties with a material having weaknesses in those same property areas, certain practical considerations inhibit successful implementation of this theory.

For example, today's modern society requires materials and structures which can rapidly go from one temperature extreme to another without showing structural defects such as cracking, brittleness, lack of rigidity, modulus and impact strength. These properties and others are of particular significance in designing a food carrying container which is able to go from the freezer to the high temperature conventional oven in a period of a few seconds. Of perhaps even greater interest is the ability of the container to be "dual ovenable", that is to function not only in the conventional oven fueled by gas or electricity but also in the microwave oven. In the latter case the container structure must not only be resistant to heat but it must also be transparent to the microwave energy.

It has now been discovered that certain specific multilayer structures will have the desired property mix and have strong inter layer adherence to each other without the oftentimes observed interfacial instability even though the viscosities of the adjacent resin layers are widely divergent.

SUMMARY OF THE INVENTION

In accordance with the invention, there is a multilayer structure which comprises a layer comprising polybutylene terephthalate adjacent to a layer comprising an aromatic polyester selected from the group consisting of aromatic polycarbonate, copolyestercarbonate, polyarylate or mixtures thereof. It is preferred that the layer having the aromatic polyester be essentially free of polyolefin.

A further aspect of the invention is containers of the hereindefined structure. Generally, these containers are prepared by thermoforming a coextruded structure, however hollow containers can be readily prepared by blow molding a coextruded structure.

The polybutylene terephthalate which can be employed in the multilayer structure is either straight chain or branched. The straight chain polybutylene terephthalate is prepared by standard methods well known in the art from 1,4-butanediol and dimethyl terephthalate. The branched polybutylene terephthalate is also prepared by standard methods in the art, as described, for example, in U.S. Pat. No. 2,936,296 and U.S. Pat. No. 3,692,744, incorporated by reference. The "branch" is put into the normally linear polybutylene terephthalate by utilizing and additional reactant which has as least three functional groups which are reactive with either the alcoholic group of the 1,4-butanediol or the carboxy or carboxy ester group of the terephthalic moiety. The polybutylene terephthalates are commercially available from a number of companies, for example as VALOX ® polybutylene terephthalate resin from General Electric Company. Branched polybutylene terephthalate is specifically available commercially. The melt viscosity of the polybutylene terephthalate resin is generally at least about 1500 to 2800 poise @300° C.

The aromatic polyester layer is adjacent to the polybutylene terephthalate layer. The aromatic polyester is polycarbonate, copolyestercarbonate, polyarylate or mixtures thereof. Aromatic polycarbonates are prepared in the conventional manner by reacting a dihydric phenol with a carbonate precursor in an interfacial polymerization process or transesterification. Typical of some of the dihydric phenols that may be employed in the practice of this invention are 2,2-bis(4-hydroxyphenyl)propane (bisphenol-A), (2,2-bis(4-hydroxy-3-methylphenyl)propane, 4,4-bis(4-hydroxyphenyl)heptane, 2-2(3,5,3',5'-tetrachloro-4,4'-dihydroxydiphenyl)-propane, 2,2-(3,5,3',5'-tetrabromo-4,4'-dihydroxydiphenyl)propane, (3,3'-dichloro-4,4'-dihydroxyphenyl)methane, bis 4-hydroxy phenyl sulfone and bis 4-hydroxy phenyl sulfide. Other dihydric phenols of the bisphenol type are also available and are disclosed in U.S. Pat. Nos. 2,999,835; 3,028,365 and 3,334,154, each incorporated by reference. Bisphenol-A is preferred.

It is, of course, possible to employ two or more different dihydric phenols or a copolymer of a dihydric phenol with a gylcol or with hydroxy or acid terminated polyester, or with a dibasic acid in the event a carbonate copolymer or interpolymer rather than a homopolymer is desired for use in the preparation of the aromatic carbonate polymers of this invention. Also employed in the practice of this invention may be blends of any of the above materials to provide the aromatic carbonate polymer.

The carbonate precursor may be either a carbonyl halide, a carbonate ester or a haloformate. The carbonyl halides which can be employed herein are carbonyl bromide, carbonyl chloride and mixtures thereof. Typical of the carbonate esters which may be employed herein are diphenyl carbonate, di-(halophenyl) carbonates such as di(chlorophenyl) carbonate, di-(bromophenyl) carbonate, di-(trichlorophenyl) carbonate, di(tribromophenyl) carbonate, etc., di-(alkylphenyl) carbonate such as di(tolyl) carbonate, etc., di-(naphthyl) carbonate, di-(chloronaphthyl) carbonate, phenyl tolyl carbonate, chlorophenyl chloronaphthyl carbonate, etc., or mixtures thereof. The haloformates suitable for use herein include bis-haloformates of dihydric phenols (bis-chloroformates of hydroquinone), or glycols (bishaloformates of ethylene glycol, neopentyl glycol, polyethylene glycol, etc.). While other carbonate precursors will occur to those skilled in the art, carbonyl chloride, also know as phosgene, is preferred.

The aromatic polycarbonates of this invention may be prepared by employing a molecular weight regulator, an acid acceptor and a catalyst, The molecular weight regulators which can be employed in carrying out the process of this invention include monohydric phenols such as phenol, Chroman-I, paratertiarybutylphenol, parabromophenol, primary and secondary amines, etc.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor may be one which can be either a hydroxide, a carbonate, a bicarbonate, or a phosphate or an alkali or alkaline earth metal.

The catalysts which are employed herein can be any of the suitable catalysts that aid the polymerization of bisphenol-A with phosgene. Suitable catalysts include tertiary amines such as, for example, triethylamine, tripropylamine, N,N-dimethylaniline, quaternary ammonium compounds such as, for example, tetraethylammonium bromide, cetyl triethyl ammonium bromide, tetra-n-heptyl-ammonium iodide, tetra-n-propyl ammonium; bromide, tetramethylammonium chloride, tetramethyl ammonium hydroxide, tetra-n-butylammonium iodide, benzyltrimethylammonium chloride and quaternary phosphonium compounds such as, for example, n-butyltriphenyl phosphonium bromide and methyltriphenyl phosphonium bromide.

Also included herein are branched polymers wherein a polyfunctional aromatic compound is reacted with the dihydric phenol and carbonate precursor to provide a thermoplastic randomly branched polycarbonate polymer.

These polyfunctional aromatic compounds contain at least three functional groups which are carboxyl, carboxylic anhydride, haloformyl, hydroxyl (polyfunctional phenols) or mixtures thereof. Examples of these polyfunctional aromatic compounds which may be employed in the practice of this invention include: trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride and the like.

preferred polyfunctional aromatic compounds are trimellitic anhydride or trimellitic acid, or their haloformyl derivatives.

Also, included herein are blends of a linear polymer and a branched polymer.

Aromatic copolyestercarbonates are prepared in the art recognized manner as disclosed in U.S. Pat. No. 3,169,121, incorporated by reference and U.S. Pat. No. 4,465,820, incorporated by reference as well as by other techniques such as melt polymerization. The dihydric phenols used in the copolyestercarbonates have the same broad grouping of structures as in the aromatic polycarbonates. The aromatic ester precursors such as the phthalic acids themselves, phthalic acid halides, preferably chlorides and the phthalic acid esters, as well as the naphthalenic acids, halides (preferable chlorides) and esters are coreacted with the dihydric phenols or esters derivatives thereof and the carbonate precursor to form the aromatic copolyestercarbonate. The phthalic acid ester precursors particularly the isophthalic and terephthalic are preferred groups in the copolyestercarbonate backbone. Although any ester content may be present in the aromatic copolyestercarbonate, it is generally preferred to have from about 25 to 90 mole percent of the copolyestercarbonate as ester. More preferably is that 50 mole percent of the copolyestercarbonate be ester content. With respect to the other characteristics of copolyestercarbonates, the entire disclosure of U.S. Pat. No. 3,169,121 is incorporated by reference.

Polyarylates are prepared in the usual manner, for example as disclosed in U.S. Pat. No. 4,454,308, incorporated by reference. Dihydric phenols or their derivatives are reacted with aromatic diacids or their halide (chloride) or ester derivatives to form the polyarylate. The isophthalate, terephthalate and bisphenol-A units are preferred in the polyarylate.

In general, the polybutylene terephthalate should be essentially free of polyolefins, particularly polypropylene. Any polyolefin present in the polybutylene terephthalate layer should be less than twenty-five (25) percent of the weight of the polyolefin and the polybutylene terephthalate, preferably less than fifteen weight percent and more preferably less than five weight percent polyolefin.

The two layer system can have any number of other layers attached to either of the two layers as long as they are compatible and will adhere thereto. The preferred three layer system is polybutylene terephthalate/aromatic polyester (preferably copolyestercarbonate/polybutylene terephthalate). Each of the resins in the layers may be blended with other thermoplastic resins which are compatible with the blended resin at the quantities employed and which still provide a firm bond with the adjacent layer. The most useful blends from the commercial sense arise from the utilization of the scrap material present from the thermoforming process. This material can then be reground and extruded together with the aromatic polyester layer of the aforementioned preferred three layer system so as to have a polybutylene terephthalate/polybutylene terephthalate aromatic polyester blend/polybutylene terphthalate structure. Another option is to coextrude the reground material as a tie layer between the polybutylene terephthalate and aromatic polyester interfaces thereby providing a five layer structure such as polybutylene terephthalate/polybutylene terephthalate aromatic polyester blend/aromatic polyester/polybutylene terephthalate aromatic polyester blend/polybutylene terephthalate. In all of these structures the aromatic polyester can be polycarbonate, copolyestercarbonate or polyarylate, preferable copolyestercarbonate.

A further aspect of the invention is the blends of polybutylene terephthalate and aromatic polyester which are prepared from the reground scrap material. General blends having from about 15 to 70 weight percent polybutylene terephthalate as measured by total weight of polybutylene terephthalate plus aromatic polyester are adequate. Preferably levels of polybutylene terephthalate are from about 30 to 50 weight percent.

The polybutylene terephthalate/aromatic polybutylene terephthalate structures are prepared by extruding the polymer resins through a multi-manifold die or through a feedblock where the polymer layers are combined and then through a die where the polymer melt (combined layers) flows to its full width and thickness.

The heats on the extruders are set to match the viscosities of the polymer melts as closely as possible. The viscosities must be closely matched in order to prevent interfacial instability between the polymer melt layers. The temperatures in the polybutylene terephthalate extruder can range from about 420° to 520° F. in order to match the viscosity of the aromatic polyester melts. The temperatures of the aromatic polyester extruders can range from 500° to 650° F. or somewhat higher if a polyarylate is used.

EXAMPLES

Several polybutylene terephthalate/aromatic polyester/polybutylene terephthalate structures were produced using various melt flow aromatic polyesters. The melt viscosity ranges for the biphenol-A polycarbonates were 10–20,000 poise @250° C., 30–40,000 poise @250° C., 50–60,000 poise @250° C., the melt viscosity of the copolyestercarbonate ranged from about 85–100,000 poise @300° C. The copolyestercarbonate employed used bisphenol-A as the dihydric phenol and was 80 mole percent ester content, 20 mole percent carbonate content. The ester content was 93% isophthalate and 7% terephthalate. The melt viscosity of the polybutylene terephthalate is approximately 7–8000 poise @250° C.

The above structures were produced in various layer thicknesses. The polybutylene terephthalate may vary from 1 to 20 mils and the aromatic polyester layers may vary from 10 to 100 mils. The three layer sheet products (polybutylene terephthalate/aromatic polyester/polybutylene terephthalate) showed good appearance, adherence and strength. Trays were thermoformed from the multilayer sheet. The trays formed easily and were of good appearance, adherence and strength.

What is claimed is:

1. A multilayer structure which consisting essentially of a layer comprising a branched polybutylene terephthalate free of polyolefin adjacent to a layer comprising an aromatic polyester selected from the group consisting of aromatic polycarbonate, copolyestercarbonate, polyarylate, or mixtures thereof.

2. The structure of claim 1 wherein the aromatic polyester is polycarbonate.

3. The structure of claim 2 wherein the polycarbonate contains repeating units of the residue of bisphenol-A.

4. The structure of claim 1 wherein the layer of aromatic polyester is adjacent to a second layer consisting essentially of branched polybutylene terephthalate free of polyolefin.

5. A multilayer structure which comprises a layer consisting essentially branched a polybutylene terephthalate free of polyolefin adjacent to a layer comprising an aromatic polyester selected from the group consisting of copolyestercarbonate and polyarylate.

6. The structure of claim 1 wherein the aromatic polyester is copolyestercarbonate.

7. The structure of claim 6 wherein the copolyestercarbonate contains repeating units of the residue of bisphenol-A.

8. The structure of claim 1 wherein the aromatic polyester is polyarylate.

9. The structure of claim 8 wherein the polyarylate contains repeating units of the residue of bisphenol-A.

10. The structure of claim 4 in the formed shape of a container.

* * * * *

UNITED STATES PATENT AND TRADEMARK OFFICE
CERTIFICATE OF CORRECTION

PATENT NO. : 4,804,566
DATED      : February 14, 1989
INVENTOR(S): William Charles Paul
             Kirk Lee Kimbel It is certified that error appears in the above-identified patent and that said Letters Patent is hereby corrected as shown below:

Column 1

Line 13
"propertie" should read "properties"

Column 3

Line 49
Add "The" before "preferred"

Signed and Sealed this

Fourth Day of September, 1990

Attest:

HARRY F. MANBECK, JR.

Attesting Officer

Commissioner of Patents and Trademarks